United States Patent [19]

Fennern

[11] Patent Number: 5,204,053
[45] Date of Patent: Apr. 20, 1993

[54] BI-LEVEL FUEL MANAGEMENT METHOD FOR BOILING-WATER NUCLEAR REACTOR

[75] Inventor: Larry E. Fennern, San Jose, Calif.

[73] Assignee: General Electric Company, San Jose, Calif.

[21] Appl. No.: 804,301

[22] Filed: Dec. 9, 1991

Related U.S. Application Data

[62] Division of Ser. No. 533,073, Jul. 10, 1990, Pat. No. 5,116,567.

[51] Int. Cl.⁵ .............................................. G21C 19/00
[52] U.S. Cl. .................................... 376/267; 376/433; 376/370
[58] Field of Search ............... 376/267, 434, 270, 271, 376/428, 433, 370

[56] References Cited

U.S. PATENT DOCUMENTS 3,128,235  4/1964  Hackney et al. .................... 376/433
3,284,310  11/1966  Straat .................................. 376/433
4,326,922  4/1982  Ferrari et al. ........................ 376/433

*Primary Examiner*—Donald P. Walsh
*Assistant Examiner*—Frederick H. Voss
*Attorney, Agent, or Firm*—Robert R. Schroeder

[57] ABSTRACT

Fuel management in a boiling-water nuclear reactor involves arranging fuel bundles in upper and lower matrices of the reactor core. During a refueling operation, some bundles in the upper matrix are removed and retired, while fresh bundles are inserted in the lower matrix and some bundles originally in the lower matrix are transferred to the upper matrix. In the transfer, fuel bundles are inverted so that included fuel rods in the lower matrix have their plenums oriented downward, while fuel rods in the upper matrix have their plenums oriented upward. This method provides greater flexibility in repositioning fuel bundles for longer burnups and lower high-level waste. In particular, problems with axial spectral variations in neutron flux can be compensated for using the disclosed refueling procedure.

5 Claims, 6 Drawing Sheets

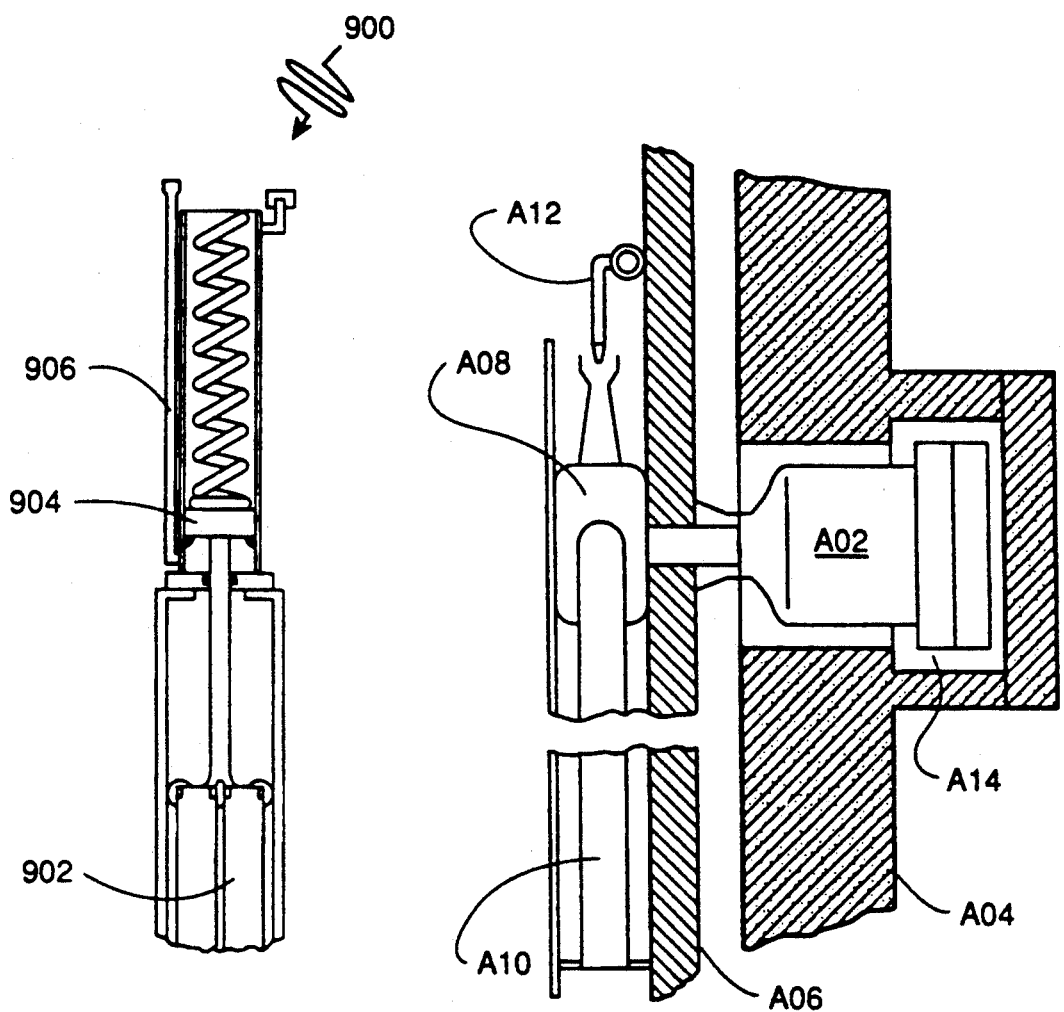
*Figure 9*      *Figure 10*

BI-LEVEL FUEL MANAGEMENT METHOD FOR BOILING-WATER NUCLEAR REACTOR

BACKGROUND OF THE INVENTION

This is a divisional of allowed U.S. Pat. No. 5,116,567 copending application Ser. No. 07/553,073, filed Jul. 10, 1990.

This invention relates to nuclear reactors and, more particularly, to a method of managing fuel in a boiling water reactor. A major objective of the present invention is to provide for more thorough fuel burnups to enhance fuel utilization and minimize active waste products.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in modular units. These units can be bundles of vertically extending fuel rods. Each rod has a cladding which encloses a stack of fissile fuel pellets. Generally, each rod includes a space or "plenum" for accumulating gaseous byproducts of fission reactions which might otherwise unacceptably pressurize the rod and lead to its rupture. The bundles are arranged in a two-dimensional array in the reactor. Neutron-absorbing control rods are inserted between or within fuel bundles to control the reactivity of the core. The reactivity of the core can be adjusted by incremental insertions and withdrawals of the control rods.

Both economic and safety considerations favor improved fuel utilization, which can mean less frequent refuelings and less exposure to radiation from a reactor interior. In addition, improved fuel utilization generally implies more complete fuel "burnups".

A major obstacle to obtaining long fuel element lifetimes and complete fuel burnups is the inhomogeneities of the neutron flux throughout the core. For example, fuel bundles near the center of the core are surrounded by other fuel elements. Accordingly, the neutron flux at these central fuel bundles exceeds the neutron flux at peripheral fuel bundles which have one or more sides facing away from the rest of the fuel elements. Therefore, peripheral fuel bundles tend to burn up more slowly than do the more central fuel bundles.

The problem of flux density variations with radial core position has been addressed by repositioning fuel bundles between central and peripheral positions. This results in extended fuel bundle lifetimes at the expense of additional refueling operations.

Variations in neutron flux density occur in the axial direction as well as the radial direction. For example, fuel near the top or bottom of a fuel bundle is subjected to less neutron flux than is fuel located midway up a fuel bundle. These axial variations are not effectively addressed by radial redistribution of fuel elements.

In addition to the variations in neutron flux density, variations in spectral distribution affect burnup. For example, in a boiling-water reactor (BWR), neutrons released during fissioning move too quickly and have too high an energy to readily induce the further fissioning required to sustain a chain reaction. These high energy neutrons are known as "fast" neutrons. Slower neutrons, referred to as "thermal neutrons", most readily induce fission.

In BWRs, thermal neutrons are formerly fast neutrons that have been slowed primarily through collisions with hydrogen atoms in the water used as the heat transfer medium. Between the energy levels of thermal and fast neutrons are "epi-thermal" neutrons. Epithermal neutrons exceed the desired energy for inducing fission but promote resonance absorption by many actinide series isotopes, converting some "fertile" isotopes to "fissile" (fissionable) isotopes. For example, epithermal neutrons are effective at converting fertile U238 to fissile Pu239. Within a core, the percentages of thermal, epithermal and fast neutrons vary over the axial extent of the core.

Axial variations in neutron spectra are caused in part by variations in the density or void fraction of the water flowing up the core. In a boiling-water reactor (BWR), water entering the bottom of a core is essentially completely in the liquid phase. Water flowing up through the core boils so most of the volume of water exiting the top of the core is in the vapor phase, i.e., steam. Steam is less effective than liquid water as a neutron moderator due to the lower density of the vapor phase. Therefore, from the point of view of neutron moderation, core volumes occupied by steam are considered "voids"; the amount of steam at any spatial region in the core can be characterized by a "void fraction". Within a fuel bundle, the void fraction can vary from about zero at the base to about 0.7 near the top.

Continuing the example for the BWR, near the bottom of a fuel bundle, neutron generation and density are relatively low, but the percentage of thermal neutrons is high because of the moderation provided by the low void fraction water at that level. Higher up, neutron density reaches its maximum, while void fraction continues to climb. Thus, the density of thermal neutrons peaks somewhere near the lower-middle level of the bundle. Above this level, neutron density remains roughly stable while the percentages of epithermal and fast neutrons increase. Near the top of the bundle, neutron density decreases across the spectrum since there are no neutrons being generated just above the top of the bundle.

The inhomogeneities induced by this spectral distribution can cause a variety of related problems. Focusing on the upper-middle section, problems of inadequate burnup and increased production of high-level waste are of concern. Since the upper-middle section has a relatively low percentage of thermal neutrons, a higher concentration of fissile fuel is sometimes used to support a chain reaction. If the fuel bundle has a uniform fuel distribution, this section could fall below criticality (the level required to sustain a chain reaction) before the other bundle sections. The fuel bundle would have to be replaced long before the fissile fuel in all sections of the bundle were depleted, wasting fuel.

The problem with waste disposal is further aggravated at this upper-middle section since the relatively high level of epithermal neutrons results in increased production of actinide-series elements such as neptunium, plutonium, americium, and curium, which end up as high level-waste.

One method of dealing with axial spectral variations is using a control rod. For the BWR, control rods typically extend into the core from below and contain neutron-absorbing material which robs the adjacent fuel of thermal neutrons which would otherwise be available for fissioning. Thus, control rods can be used to modify the distribution of thermal neutrons over axial position to achieve more complete burnups. However, control rods provide only a gross level of control over spectral density.

More precise compensation for spectral variations can be implemented using enrichment variation and burnable poisons. Enrichment variation using, for example, U235 enriched uranium, can be used near the top of a fuel bundle to partially compensate for a localized lack of thermal neutrons. Similarly, burnable poisons such as gadolinium oxide ($Gd_2O_3$), can balance the exposure of bundle sections receiving a high thermal neutron flux. Over time, the burnable poisons are converted to isotopes which are not poisons so that more thermal neutrons become available for fissioning as the amount of fissile material decreases. In this way, fissioning can remain more constant over time in a section of the fuel bundle. By varying the amount of enrichment and burnable poisons by axial position along a bundle, longer and more complete burnups can be achieved. In addition, the enrichment and poison profiles can be varied by radial position to compensate for radial variations in thermal neutron density.

Nonetheless, taken together, the use of control rods, radial positional exchange of bundles, selective enrichment and distribution of burnable poisons still leave problems with axial variations in burn rates and neutron spectra. Furthermore, none of these employed methods effectively addresses the problem of the high level of fissile material produced and left in the upper-middle sections of the bundle due to the high level of epithermal neutrons and the low level of thermal neutrons. What is needed is a system that deals more effectively with axial spectral variations in neutron flux so that higher fuel burnups are provided and the so that high-level waste is minimized.

SUMMARY OF THE INVENTION

In accordance with the present invention, a method for managing fuel in a boiling-water nuclear reactor involves arranging fuel bundles in a bi-level core and, during a refueling operation, moving fuel bundles from one level to the other. The bi-level core includes two sets of fuel units, one set arranged in an upper matrix, the other set arranged in a lower matrix. Preferably, fuel units of the upper matrix are arranged in vertical alignment with fuel units of the lower matrix. This permits a fuel unit of the lower matrix to be accessed by removing only the adjacent fuel unit of the upper matrix. During refueling operations, fuel units can be shifted from one matrix to the other, providing additional flexibility in arranging units at various stages of burnup. Preferably, fuel units of the lower matrix are inverted relative to the fuel units of the upper matrix. The inversion provides for placing plenum sections of fuel rods in different levels away from each other so that the plenums do not introduce a discontinuity in neutron generation.

The fuel bundles share a common form factor so that each fuel bundle can be placed in any position in either matrix. During refueling operations net transfers are as follows: spent bundles are removed from the lower matrix, partially spent bundles from the upper matrix are inserted into the lower matrix, and fresh bundles are inserted into the upper matrix. This fuel bundle "flow" is an average flow and does not exclude the possibilities that some elements are retired from the upper matrix, some fresh fuel bundles are inserted into the lower matrix, and that some partially spent fuel bundles are transferred from the lower matrix to the upper matrix.

The fuel bundles can contain multiple fuel rods. Each fuel rod can include a plenum at one end where gaseous fission byproducts can accumlate. The plenum ends are preferably directed away from the interface between the upper and lower matrices. In other words, the plenums are up in the upper matrix and down in the lower matrix. Otherwise, at least one plenum would be positioned between the fuel in the same rod and the fuel in the corresponding rod in the other matrix. This would introduce discontinuities in neutron generation and temperature. Separation of fuel in the upper and lower matrices is minimized by inverting the fuel bundles when they are moved from one matrix to the other.

Moreover, channel and core stability are enhanced using this inverted fuel bundle arrangement. Stable thermal hydraulic operation, that is, the propensity to damp stochastic disturbances in flow and void fraction, is promoted more effectively where there is a liquid water phase adjacent to the fuel rod plenums than where there is a combination of liquid and vapor phases. Relative to one-level cores in which all plenums are near the top, the present invention provides greater stability since at least part of the plenum volume is at the core entrance where there are no steam voids and the overall two-phase flow pressure drop is reduced.

Due to heating by the core, the void fraction of the water increases at higher levels so that the steam void fraction is greater at the level of the upper matrix than it is at the level of the lower matrix. Accordingly, neutron moderation is more effective at the lower level than at the upper level. Because of the difference in moderation, fuel bundles in the upper matrix are subjected to a harder neutron spectrum than are the fuel bundles in the lower matrix.

The harder neutron spectrum can be taken advantage of by the fresher fuel bundles in the upper matrix. The harder neutron spectrum contains a higher percentage of fast and epithermal neutrons, while the thermal neutron spectrum contains a higher percentage of slower thermal neutrons. Thermal neutrons are more effective than faster neutrons at causing fission. The faster neutrons are more likely to be subjected to resonance absorption, which is likely to result in a non-fissioning neutron absorption.

Non-fissioning neutron absorption results in isotopic enhancement. In other words, the hard neutron spectrum breeds fissile fuel from fertile material. The primary reaction is the absorption of a fast neutron by fertile U238 to yield fissile Pu239. Neutron absorption by Pu239 can result in fission or in the formation of the next plutonium isotope, fertile Pu240. Neutron absorption by fertile Pu240 results in a fissile Pu241 isotope. The net effect of the hard neutron spectrum is production of additional fissile material as the original fissile material is partially spent. Thus, the relatively hard neutron spectrum of the upper fuel matrix can be used to breed fissile fuel, enhancing the operational lifetime of a fuel bundle.

The harder neutron spectrum in the upper matrix is less effective in inducing fission. This is not a problem where relatively fresh fuel bundles in the upper matrix contain relatively high concentrations of fissile fuel, typically, U235. As the U235 is depleted faster than additional fissile fuel is created, the hard neutron spectrum would eventually be unable to support a chain reaction. Prior to this point, the no-longer-fresh fuel bundle can be transferred from the upper matrix to the lower matrix, which is exposed to a more thermal neutron spectrum.

Since thermal neutrons are most effective at inducing fission, fuel in the lower matrix can be more fully utilized. This provides advantages in fuel economics as well as waste disposal. Since the fuel in the lower matrix is subjected to a thermal spectrum, there is less resonance absorption, resulting in less high-level waste. In addition, the thermal neutron spectrum at the lower matrix is less prone to breed additional fissile material. Thus, isotopic enhancement, which might otherwise contribute to higher levels of radioactivity in the spent fuel elements, is minimized by the soft neutron spectrum of the lower matrix.

In summary, the present invention provides for enhanced fuel utilization, by taking advantage of axial neutron spectral shifts through the core. As a result, fuel lifetimes are increased and the quantity of high-level nuclear waste is minimized. These and other features and advantages of the present invention are apparent in the following description with references to the drawings below.

BRIEF DESCRIPTION OF THE DRAWINGS

FIG. 9 shows a side sectional view of an alternate hydraulic control rod drive provided for by the present invention.

FIG. 10 is a side sectional view of a recirculation pump for use in an alternative embodiment of the present invention.

DESCRIPTION OF THE PREFERRED EMBODIMENTS

Figure 1:
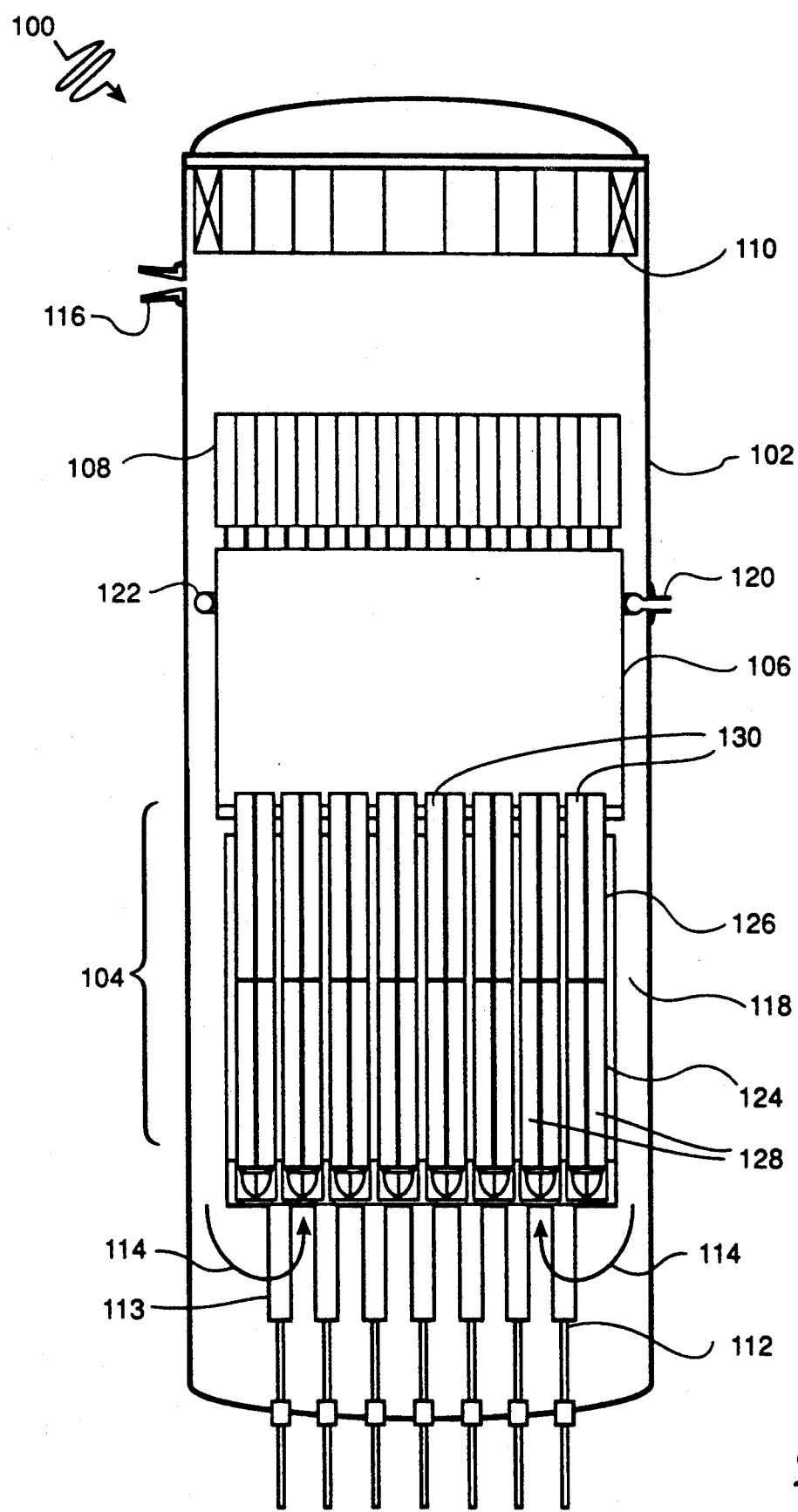
FIG. 1 is a schematic elevational sectional view of a reactor in accordance with the present invention.

In accordance with the present invention, a natural-circulation boiling-water reactor 100 comprises a vessel 102, a core 104, a chimney 106, a steam separator 108, and a dryer 110. Control rod drive housings 112 extend through the bottom of vessel 102 and support control rod guide tubes 113. Control rod guide tubes 113 extend to the bottom of core 104 so that control blades therein can be inserted into and retracted from core 104 to control its power output.

Water flows, as indicated by arrows 114, into core 104 from below. This subcooled water is boiled within core 104 to yield a water/steam mixture which rises through chimney 106. Steam separator 108 helps separate steam from water, and the released steam exits through a steam exit 116 near the top of vessel 102. Before exiting, any remaining water entrained in the steam is removed by dryer 110. Water is returned down peripheral downcomer 118 by the force of the driving steam head provided by chimney 106. Feedwater enters vessel 102 through a feedwater inlet nozzle 120 and feedwater sparger 122 to replenish and to help cool the recirculating water in downcomer 118.

Figure 2:
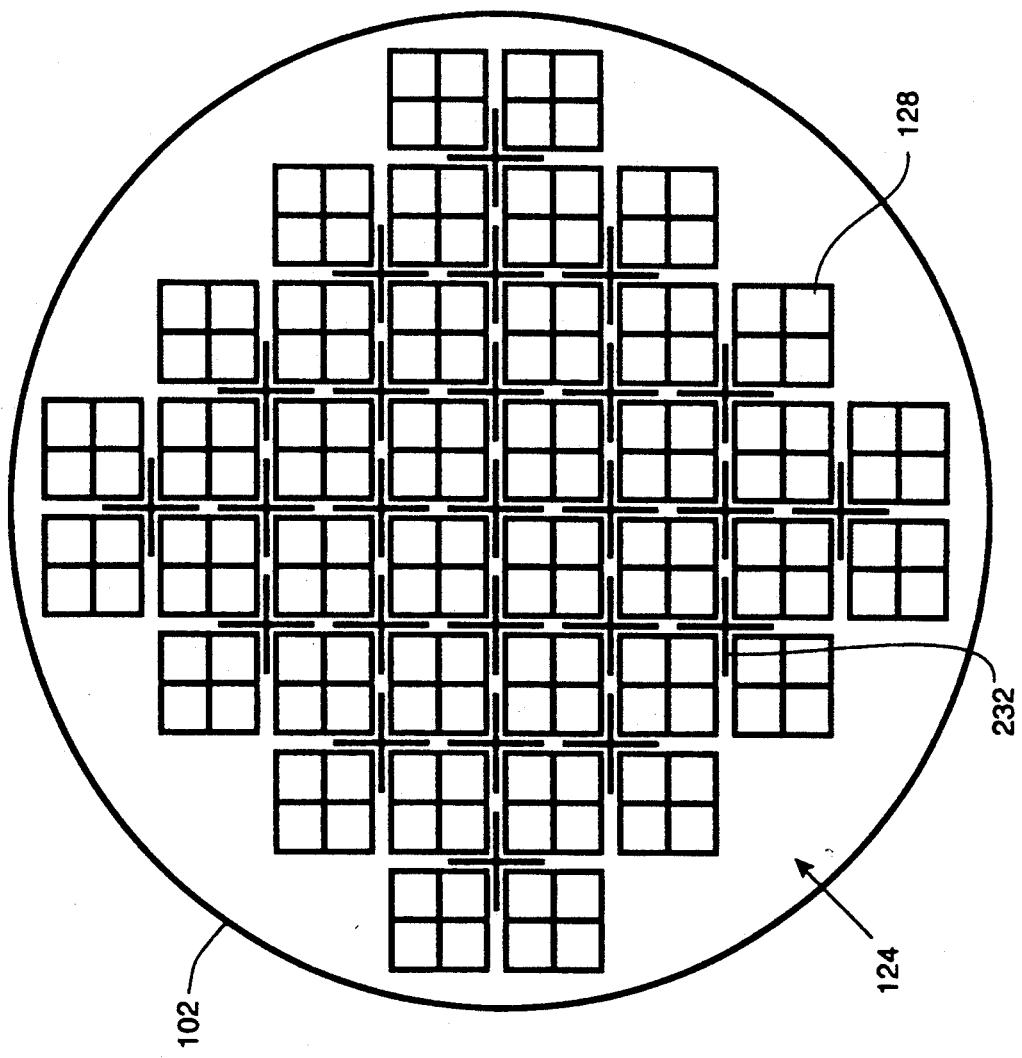
FIG. 2 is a schematic upper sectional view of the reactor of FIG. 1.

Core 104 comprises a lower fuel matrix 124 and an upper fuel matrix 126. Upper fuel matrix 126 is filled with upwardly oriented fuel bundles 130, and lower fuel matrix 124 is filled with downwardly oriented fuel bundles 128. Fuel bundles 128 of lower matrix 124 are arranged in a two-dimensional array, as shown in FIG. 2. Fuel bundles 130 of upper matrix 126 are arranged in a similar array directly above. Spaces are left between groups of four fuel bundles for control rods 232 with cruciform cross sections to move vertically to regulate power output.

Figure 3:
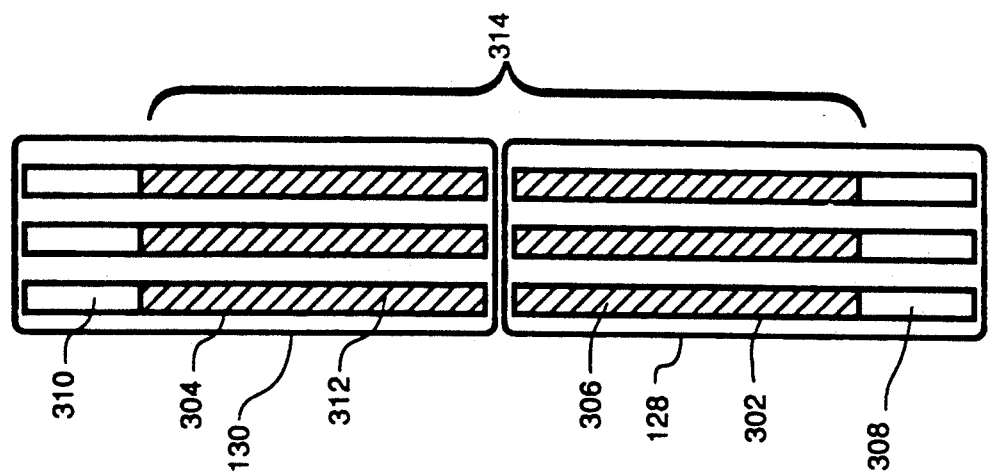
FIG. 3 is a schematic elevational view of a pair of fuel bundles in the reactor of FIG. 1.

Upper fuel bundles 130 are stacked on lower fuel bundles 128, as shown in FIG. 3. As schematically indicated in FIG. 3, each fuel bundle contains multiple fuel rods. Lower fuel bundle 128 includes fuel rods 302, and upper fuel bundle 130 includes fuel rods 304. Each lower fuel rod 302 includes a fuel section 306 and a plenum 308 which leaves space for gaseous byproducts of fission reactions to accumulate. Otherwise, pressure buildup within a fuel rod could lead to a breach of the fuel rod cladding. Note that fuel rods 302 are vertically oriented with their plenums 308 below their fuel sections 306. Likewise, upper fuel rods 304 are vertically oriented with their plenums 310 above their fuel sections 312.

The inverted relationship of fuel bundles 128 and fuel bundles 130 thus defines a relatively continuous fuel section 314 between lower plenums 308 and upper plenums 310. This physical continuity provides a greater degree of thermal continuity and neutron flux continuity than would be provided if lower fuel bundles 128 were not inverted. Relative to fuel elements in one-level cores, there is less plenum space at a level with a two-phase flow. In particular, core 104 provides half of its plenum space near its entrance where almost all of the adjacent water is in the liquid phase. Thus, the present invention provides that more plenum space is adjacent to a single-phase water flow region, enhancing channel and core stability.

The bi-level fuel bundle arrangement of the present invention provides additional flexibility in the redistribution of fuel bundles during refueling operations. In particular, a level as well as an array position can be selected for each fuel bundle. This provides for a refueling scheme in which fresh fuel bundles are installed in upper matrix 126 where a harder neutron spectrum can convert fertile fuel to fissile fuel. Partially spent fuel bundles can be moved from upper matrix 126 to lower matrix 124 where the more thermal neutron flux can more effectively utilize the remaining fissile fuel. Fertile fuel conversion is minimized in the lower matrix so that a relatively complete burnup is possible, minimizing the quantity of high-level radioactive waste products in the fuel bundle.

Figure 4:
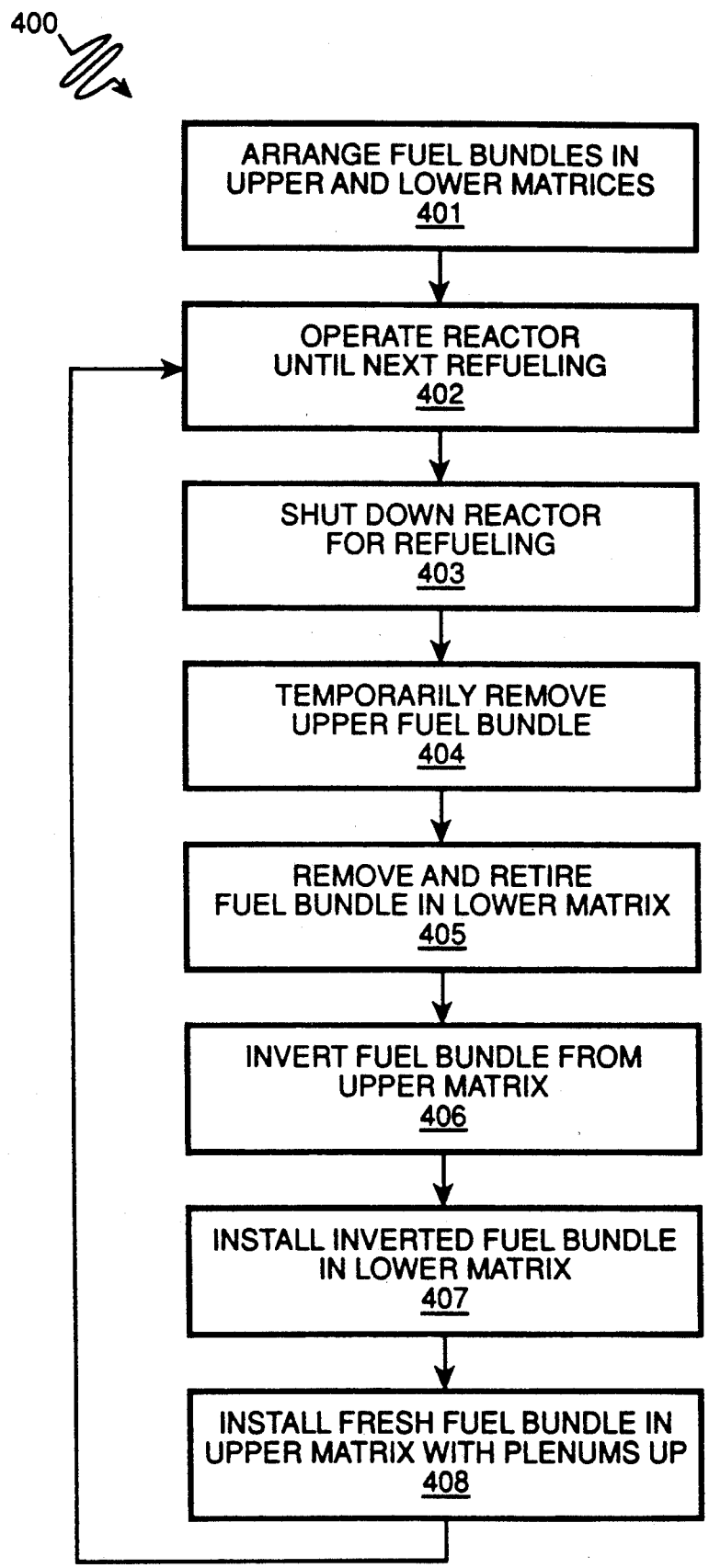
FIG. 4 is a flow chart of a method of arranging fuel elements in the reactor of FIG. 1 in accordance with the present invention.

More specifically, a preferred refueling method 400 in accordance with the present invention begins, at step 401, with the two-level arrangement of core 104, as indicated in FIG. 4. Reactor 100 is operated initially with all fresh fuel bundles, at step 402. Reactor 100 is shut down for refueling, as indicated in step 403.

Some or all fuel bundles in upper matrix 126 are removed, at step 404, and placed in temporary storage. Fuel bundles in lower matrix 124 are removed, at step 405, from vessel 102 and processed for disposal. The temporarily removed fuel bundles from upper matrix 126 are inverted, at step 406, and installed in lower matrix 124, at step 407. Fresh fuel bundles are then installed, at step 408, plenum side up in upper matrix 126. Reactor 100 is then reactivated, reiterating method 400 beginning with step 402.

Method 400 can be applied to one pair of fuel bundles or to many at a time. The invention provides for repositioning a fuel bundle from top upper matrix 126 to the corresponding position in lower matrix 124. Alternatively, the fuel bundle can be positioned within lower matrix 124 at a position other than the one under its original position in upper matrix 126.

Method 400 is adapted to the axial spectral shift in neutron flux due to boiling in the core of a boiling-water reactor. In such a reactor, method 400 characterizes a desired net flow of fuel bundles. It does not preclude the movement of bundles within a level, or the movement of fuel bundles from the lower matrix to the upper matrix. In addition, it does not preclude introducing fresh fuel bundles into a lower matrix or retiring fuel bundles from an upper matrix. The same considerations that led to shifting fuel bundles in conventional reactors apply to reactors with bi-level cores. The present invention provides additional flexibility in redistributing fuel.

The present invention provides for cores with two or more levels of fuel units, which can be monolithic or contain multiple elements. The bundles on a level can be packed as triangles, rectangles including squares, or hexagons. Other packing shapes are also provided for. Some embodiments employing control rods do not use them at all core levels. Power output regulation can be effected using burnable poisons, adjusting coolant flow and temperature, and/or using other power regulation approaches. Access to a lower core level can be through an upper core level, from the bottom, or through lateral access.

The advance provided by the present invention in core design and refueling procedure is best understood in the context of parallel advances in reactor design and operation, as described below.

In one embodiment, core or fuel baskets are used to arrange fuel bundles into an upper or lower arrangement (i.e., one basket would contain the top layer of fuel, and a second basket would contain the bottom layer). Each basket has the capability to be covered for transfer of all bundles in a single move, and the cover or lid allows the basket to be inverted in the storage pool in preparation for transfer of fuel. These core baskets also have the capability to contain poison curtains or fuel channels, as necessary, for various fuel arrangements. Baskets can be fully or partially pre-loaded prior to a refuel outage.

The current state of the art in BWRs is split into two paths. The first path is that of the large forced-circulation boiling-water reactors (FCBWRs). The second path is represented by natural-circulation boiling-water reactors (NCBWRs).

The recent FCBWR represents a major improvement over previously existing plants because of its improved economics, enhanced safety, low maintenance, and low personnel exposure. In addition, its use of advanced control and instrumentation simplify construction and operation. The FCBWR also offers reduced construction cost per kilowatt, as well as reduced radioactive waste.

The NCBWR is designed to meet the objective of high simplicity and high inherent safety. It is also designed to meet a demand, by certain segments of the industry, for smaller plants.

The present invention provides a third type of BWR, a steam-cooled boiling-water reactor (SCBWR) with a two-stage core. A lower stage is a conventional boiling water reactor core which converts the subcooled inlet water to saturated steam. An upper stage is fed by the steam from the lower stage and converts it to superheated steam. The fuel bundle mechanical design for the two stages is identical, and the upper stage is loaded with fresh fuel while the lower stage is loaded with inverted fuel that has undergone one cycle of exposure in the upper stage. After operation in the lower stage, the fuel is discharged.

The movement of fuel from the upper to the lower stage has several advantages. It initially maximizes the conversion ratio of U238 and Pu240 by resonance capture in the hard neutron spectrum, isotopically enhancing the fuel. Subsequently, it maximizes burnout of the Pu and high-level wastes in the thermal spectrum of the boiling stage, limiting conversion of U238 near the end of bundle life. Furthermore, maximum flexibility is provided for achieving power distribution shaping by means of enrichment and burnable poisons.

With uranium fuel, a nuclear lifetime of 150,000 megawatt days per metric tonne (MWD/Tonne) is attainable. When plutonium fuel is used an exposure of 200,000 MWD/Tonne can be achieved. In either case, high conversion is achieved and significant reductions in the generation of high-level waste are realized by burning in the boiling stage. This offers some of the advantages of recycling without having to chemically reprocess fuel.

Inherent safety is achieved by the incorporation of poison curtains. Poison curtains of a boron material prevent an insertion of positive reactivity if the upper stage is flooded. The boron is essentially transparent to fast flux, but when the upper stage is flooded with water, the spectra become thermal and the boron becomes a strong poison. On the other hand, as the amount of superheat increases, the power also reduces due to neutron leakage and there is a strong negative power coefficient. Thus, if the operating point shifts too much to either side of the design point, the power is reduced automatically.

Because of the inherent characteristics of the upper stage, only the lower stage needs control rods. Furthermore, channels or flow baffles are used only in the lower, boiling stage. This allows higher power density to be achieved without bumping into stability limits. Stability is also improved by the inversion of the fuel, since the fission gas plenum volume is in the subcooled single phase rather than the two-phase region.

Figure 5:
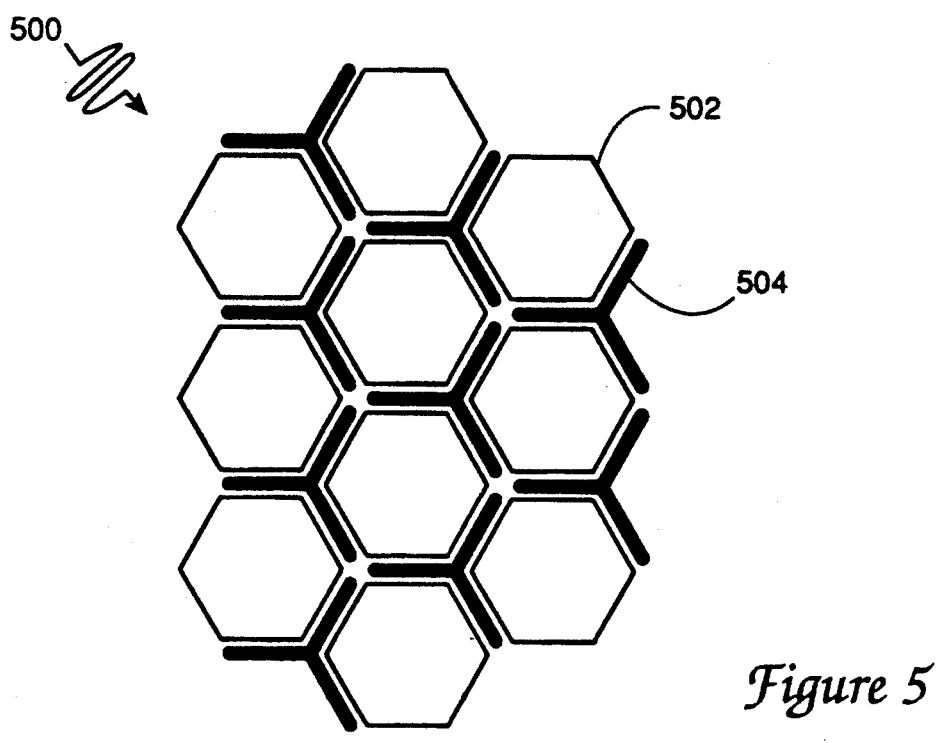
FIG. 5 is a schematic top view of an alternative core packing arrangement provided for by the present invention.

In the reactor core 500, shown in FIG. 5, fuel bundles 502 are configured hexagonally with Y-shaped upper stage poison curtains 504. The core length is approximately 3 meters (m) with only the lower half needing control rods, so the vessel length can be shortened relative to comparable FCBWR designs. With the use of a 7 m diameter vessel, an output of 1800 megawatts electric (MWe) is contemplated. This design is compatible with other passive safety features, such as a gravity-driven cooling system (GDCS).

Figure 6:
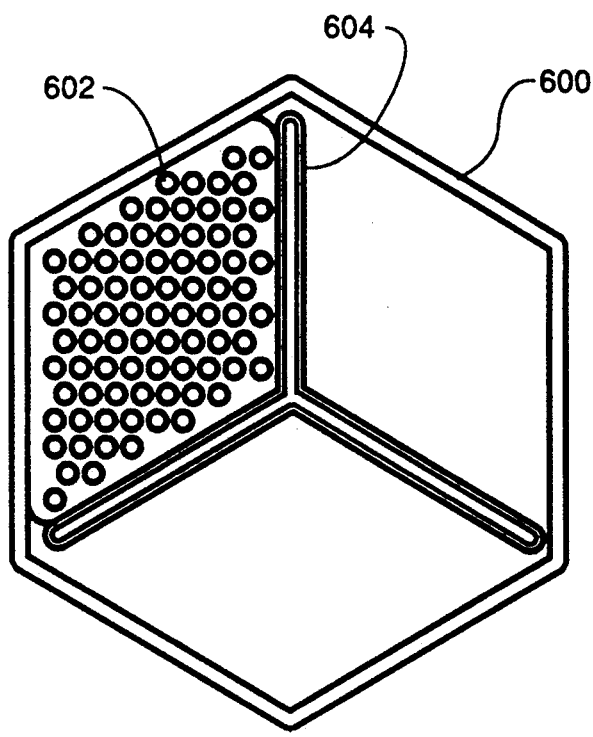
FIG. 6 is a top sectional view of an alternate hexagonal fuel bundle provided by the present invention.

In one embodiment, each fuel bundle has a control rod or control element as part of the bundle or at least installed and removed with the bundle. This allows the use of large bundles without concern for safety during shipping and handling. The use of large bundles allows shorter refueling time and fewer control rod drives or control devices. Each hexagonal bundle 600 holds four hundred fuel rods 602 arranged on a triangular pitch as indicated in FIG. 6. The refueling interval can be three years.

High enrichments on the order of 14% are used to achieve long fuel cycles and high power density. The use of burnable poisons allows the economical use of such enrichment without requiring the use of an excessive number of control elements or rods. Burnable poison will also be used to control power shape both axially and radially.

The fuel is configured for efficient generation and burning of recycled plutonium. The bundle and core are designed so that the fuel is placed in a hard neutron spectrum (high steam void fraction) early in its exposure history and a soft neutron spectrum (low steam void fraction) late in its exposure history. This spectrum shift assists actinide burnup and plutonium production early in life and plutonium burnup late in life.

One core implements a seed and blanket concept: the outer portion (blanket) of the core is tightly orificed to have a low void fraction and harder neutron spectrum; and the inner high power density portion (seed) where the flow is high and void fraction is low, yielding a softer neutron spectrum than the blanket. Another core uses a bundle designed so that it can be inverted in the middle of its life.

Figure 7:
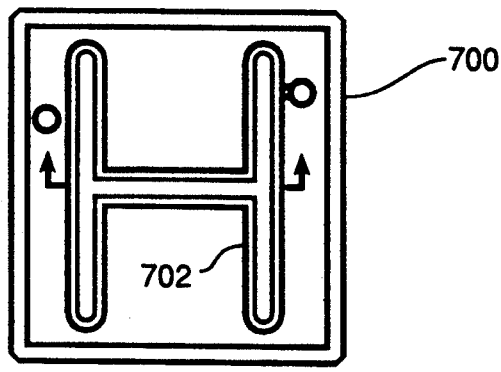
FIG. 7 is a top sectional view of a control rod blade incorporated in an alternative embodiment of the present invention.
Figure 8:
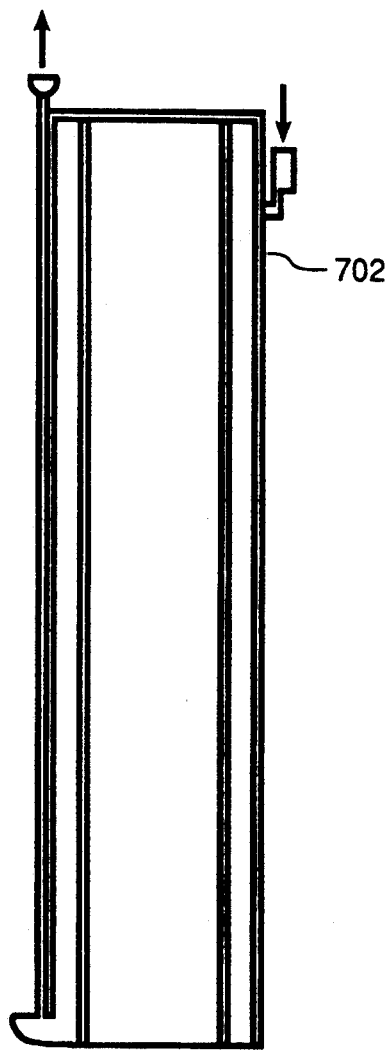
FIG. 8 is a side sectional view of the control rod blade of FIG. 7.

One embodiment uses upgraded versions of conventional locking piston, while another embodiment uses upgraded conventional fine motion control rod drive systems. In another alternative embodiment, a fuel bundle 700 having a fixed hollow-walled control element 702 can be used, as shown in FIGS. 7 and 8. As an alternative to the H-shape of element 702, a cruciform shape can be used. In the case of a hexagonal bundle 600, a fixed control element 604 can have a Y shape. Alternatively, a hexagonal fuel bundle can employ a fixed hollow-wall control element with a star shape. Yet another option would be a matrix of tubes similar to a pin-type control element. In some embodiments, sufficient wall thickness is used to withstand full reactor pressure. In other embodiments, control elements comprise a series of tubes. In still further embodiments, control elements have reinforcing ribs. Another control blade configuration uses an array of pins.

In the case of hollow-walled control elements, control is achieved by varying the level of a poison solution, such as sodium pentaborate, in the hollow member. Different embodiments provide different means for accomplishing poison solution level control. Preferably, the poison solution is displaced with gas to an external container which is at a pressure equal to the reactor pressure. The pressure in the member therefore is always above the reactor pressure which keeps the solution from boiling. Level in the member (which is analogous to control rod position in the present reactors) is measured either directly in the hollow member or indirectly by measuring the level in the container. Scram is achieved by dumping the differential pressure on loss of signal to the controller, causing all the solution to flow by gravity to the chamber, filling it to the top of active fuel.

Alternative embodiments control the level of poison solution using a moveable suction tube hooked to a device similar to a traversing incore probe (TIP) positioner. Another alternative is to use an eductor which produces a variable suction pressure. The liquid system would be configured so that result of loss of the solution due to leakage would be no worse than a stuck rod in today's reactors. By virtue of the closed system with a high gas over-pressure, boiling does not occur even during a severe accident. For refueling, the chamber is filled up to the coupling and plugged so that there is permanent suppression of the reactivity of the bundle.

One advantage of this device is that it maintains the bottom up reactivity control of the current plants which is preferred in the BWR but does so without bottom penetrations. A second advantage is that it does not require the motion of a control blade through a clearance which will make it even more immune to anticipated transient without scram (ATWS) than the present plants.

In another alternative embodiment, control blades are positioned using a hydraulic control rod drive 900 shown in FIG. 9. In this concept, a movable control blade 902 is used. Control blade 902 is lifted by water flow past a piston 904 that is attached to the upper end of blade 902. The piston travels in a cylinder 906 which has progressively larger cross-section axial notches machined in its walls. Thus it takes increasingly larger flows to raise the blade higher. Alternatively, a piston can be in a constant cross-section tube and be compressing a spring which will also result in the effect of more flow further raising the blade. A third case would have a series of holes along the length of the tube that are progressively uncovered as the piston raises. In any case, stopping the pump will cause the rod to be inserted by gravity, thereby effecting scram.

An alternative embodiment uses a turbine-driven control rod drive. Blades are moved by a lead screw, which can be a concentric double screw to reduce vertical height. The lead screw is driven by a water powered turbine which is driven by a source of clean deionized water. The lead screw engages the blade with a hydraulically latched collet that releases the blade, on loss of hydraulic pressure, causing it to drop by gravity for scram purposes.

Redundant and diverse reactivity control is preserved using boron injection. Boron can be injected by gas from a high-pressure accumulator. Alternative embodiments inject boron by pressurizing a boron tank. The tank is pressurized by admitting steam from the reactor via an explosive valve. A gas eductor is used to produce the differential pressure to provide the required flow rate. Alternatively, a steam injector can be used to produce the differential pressure.

The recirculation system for the preferred embodiment uses internal pumps. The preferred forced circulation system has pumps A02 mounted through a bioshield A04 on a vessel wall A06, and to an impellar case A08, as shown in FIG. 10. Pumps A02 are at an elevation above the core A10 and below feedwater headers A12. Each pump discharge is connected to a duct A14 to the lower support.

In the suction improvement feature, the feed water, rather than being sparged to the upper plenum, is directed to a low head eductor that raises the suction pressure enough to avoid cavitation. This feature also produces thorough mixing of the feed water and recirculation flow, thereby providing uniform core inlet enthalpy. The net positive suction head (NPSH) is expected to be adequate during periods of low feedwater flow because the pumps will be on low speed during that time. The side-mounted location of the pumps allows them to be of larger diameter than the under-vessel pumps of FCBWR and therefore they can be designed to have adequate inertia to avoid the need for motor-generator (MG) sets.

In an alternative embodiment, pumps are driven by a long shaft from motors mounted on the bottle-necked top section of the vessel. This embodiment provides enhanced access for maintenance at the expense of having long shafts inside the RPV. Alternatively, a steam-driven jet pump can be used, requiring an auxiliary steam source but having no moving parts.

Another embodiment uses a turbine-driven internal pump. A water-driven turbine is coupled to a centrifugal pump and provides the recirculation flow. The motive fluid for the turbine would be the feedwater. This device is more efficient than the feedwater-driven jet pump.

High-pressure injection systems are used in some embodiments. The self-powered reactor core isolation cooling (RCIC) has the functional capability to provide indefinite makeup capability without external power input. In this concept, the RCIC turbine drives not only an injection pump but also a direct current (DC) generator which provide power to the system when in operation and also recharges the battery which provides the power to restart the system when it trips for any reason. Within reason, the generator can be sized to power other systems required during station blackout events. This is a non-safety system.

Current containments suffer from the fact that they must be pressure retaining under accident conditions. This increases construction cost and raises public concern. It also leads to time consuming periodic leak rate testing. While any of the concepts can be used with standard containment concepts an advanced concept is proposed.

In one embodiment, the containment is continuously vented during both normal and accident conditions through a filtration train that removes any fission products not removed by the suppression pool. The discharge of the filters is directed to the stack which provides a natural draft making it a passive device. The offgas recombiner gas discharge stream is ducted to the same stack.

The filter train consists of a gravel bed which removes the particulate and provides a large surface area for plateout of other constituents. Synthetic zeolite can be used in place of the gravel. In another alternative filter design, a stainless-steel demister is maintained wet by a gravity feed of a solution such as sodium thiosulfate.

While the normal heat load from the containment produces enough draft under most conditions, a temperature inversion might destroy the draft. Therefore, fans are used for normal operation. On loss of power, a gas torch is lit and maintains draft in the stack. For severe accident hydrogen control, battery powered ignitors are used. The power requirement for the ignitors is reduced by the use of a catalyst.

In an embodiment with no bottom-mounted equipment on the RPV, the undervessel area is designed as a "core catcher" cooled by the suppression pool and made of a refractory material. Suppression pool cooling is by contact (i.e., dumping the pool on the corium) or heat transfer by having the pool water flow through the catcher. In either case, a thermally actuated valve initiates cooling. The catcher is designed to segregate the corium to a coolable geometry. The drywell is connected to the suppression pool by vents. The wetwell airspace is vented to the filter system and the path and filter system is designed to maintain the pressure atmospheric or below.

All safety-related control and instrumentation (C&I) equipment is located in four bunkered vaults within the reactor building, corresponding to the four essential electrical divisions. These vaults provide an additional degree of protection against sabotage and fire. Each vault contains a remote shutdown panel for local control of the equipment in that division, and video communications equipment for coordinating the activities of operators in the other vaults or the main control room.

Core-power monitoring is provided by a set of in-core detector assemblies which cover the full range from shutdown to full-power conditions. A gamma thermometer is employed as are fixed, in-core, calibration sensors. All monitoring and trip functions are based on local power rather than average power, thereby eliminating the need for an average power range monitor system. Core stability is ensured by protective reactor trip functions which are based on a combination of the magnitude and rate of change of local power measurements.

In the preferred plant, communications/data acquisition systems process, sensor and transmitter data are provided to the local processing equipment over fiber optic links. Control output signals are similarly transmitted to the actuators. Communication between the local logic and control equipment and the main control room and process computer system uses wireless telemetry. Local multiplexing units (LMU), which contain radio frequency transmission circuitry, collect digitized data from the processing equipment and transmit the data to receiving units in the control building. These receiving units decode and process the data for use by the process computer system and the control room displays.

The signals from the LMUs are transmitted at microwave frequencies, using repeater stations (or, in some cases, other LMUs) to route the signals to the control building receiving units. In an alternative embodiment, lower radio frequencies are used with direct broadcast techniques.

This wireless communications system employs redundancy and diversity to assure high reliability. Physical and electrical independence and separation are readily maintained for safety-related signals. To prevent interdivisional interference, different frequencies and various encoding techniques are used to assure independence of divisional signals. Alternatively, other wireless transmission methods, using infrared and laser devices, can be employed.

A neural network-based plant safeguard system (PSS) monitors the overall plant safety status and takes action to mitigate disturbances. The PSS monitors all critical process measurements and, based on pattern recognition, sends commands to various plant systems (e.g., depressurization, recirculation flow control, feedwater control, rod control, etc.) to initiate actions to mitigate transient events. In addition, the PSS, coupled with a real-time, three-dimensional core power calculation, continuously monitors the margin between the "instantaneous" core status and the fuel thermal limits, and can initiate actions to prevent a violation of thermal limits. This system allows the operating limit minimum critical power ratio (OLMCPR) to be set very close to the safety limit critical power ratio (SLMCPR).

Through the extensive application of plant-wide automation and knowledge-based operator support systems, a single operator can adequately perform all monitoring and control functions during normal and emergency conditions. All controls are voice actuated. The voice decoder receives the voice input and checks it against an audio spectrum corresponding to each qualified operator's voice, thereby limiting the voices to which the system will respond.

An expert system based on the emergency operating procedures is provided to give the operator guidance on actions which should be taken, the priority of those actions, and the maximum time available to take each action. The operator can interrogate the system to obtain the bases for the recommended actions. Once the recommended actions are approved by the operator, the system will automatically perform the tasks.

The main control room is completely non-Class 1E and is located in a non-safety grade structure. In the event of a loss of the non-Class 1E control room, control of the plant is shifted to the remote shutdown panels located in the safety-related equipment vaults or to the off-site, emergency control room.

The emergency control room and the technical support center are provided at an off-site location. Locating these facilities off-site minimizes the requirements for radiation protection and security measures during an emergency. In addition, the probability of a simultaneous loss of power at the plant and the emergency control room is small. Microwave communications transmit data between these facilities and the plant.

Diagnostic and maintenance activities on C&I equipment are performed using portable technician interface units. Operations and maintenance (O&M) procedures and historical records of maintenance activities are stored on compact disks which are located in the local panels and racks. The compact disks also store the calibration data so that the technician interface unit can automatically calibrate each replacement module before placing it in service. Spare parts management is achieved by tracking bar codes on each replaceable module using a scanner on the technician interface unit.

Maintenance instructions and equipment tagging are to be performed by a maintenance computer which is linked to the plant communications system. Upon approval from maintenance and operations personnel, the system identifies a piece of equipment as "tagged out" for maintenance by posting a notice on a digital display located on a wall near the equipment. The system also modifies the control room displays and controls associated with that equipment, and tracks the procedure through on-line communications with the technician interface unit. The operating and maintenance staff can also interrogate the maintenance computer before issuing a tagging command to ensure that the action will not violate technical specifications.

A neural network is used to predict the time to equipment failures, based on records of equipment maintenance, operating environments, and performance trends. An expert system is provided to allow flexible surveillance periods and reduced surveillance requirements for each plant system based upon a record of actural plant operating conditions (e.g., availability, capacity factor, maintenance history, etc.). As the performance of an individual system or component improves, the surveillance and maintenance schedules are automatically revised. In addition to reducing the burden on the maintenance staff, these systems improve the reliability of plant systems by assuring timely surveillance and replacement of critical components. All surveillance, testing and diagnostics activities are fully automated. The essential, on-site power source is provided by four divisions of high energy-density, nickel-cadmium batteries.

The present invention provides for the production of superheat by combining a conventional light water reactor (LWR), such as a BWR, with a liquid metal-cooled reactor (LMR). The two reactors are arranged in a process-system series configuration in which the LWR is used in conventional fashion to convert sub-cooled water into steam. LMR adds superheat to the steam. Superheated steam is conveyed to a superheat turbine-generator (T-G) for producing electricity. The condensate produced at the end of the thermodynamic process cycle is returned to the LWR as feedwater to be endlessly recycled.

This combined cycle BWR/LMR has several advantages over a comparable reactor complex in which in which a BWR and an LMR are operated independently. A major advantage is an improved heat rate, i.e., a higher net reactor output results from a given level of heat generated at the core. This improved heat rate is mainly due to superheat added by the LMR. Further contributions to the heat rate are provided by significantly reduced auxiliary power loads, improved turbine stage efficiency, improved regenerative cycle thermodynamic efficiency, and incremental improvements gained by virtue of larger T-G machine sizes.

Another advantage of the hybrid BWR/LMR is an improved fuel cycle as a result of net breeding which provides about 38% of required fissile input to the BWR and 100% for the LMR. A related advantage is the elimination of long-life waste streams by recycling actinides.

Furthermore, the hybrid reactor yields reduced costs per kilowatt electric since the entire turbine island and balance of plant is eliminated from the LMR. Moreover, separator/reheaters can be eliminated in the BWR. The site footprint per megawatt electric generated can be reduced since a separate LMR turbine building is not required. Furthermore, dual use becomes possible for various other balance-of-plant buildings. In a like manner, shared use of nuclear island equipment and support facilities results in reductions in plant size and complexity. Reductions in operation and maintenance, including site security forces, are also achieved.

This hybrid reactor presents significant safety improvements. For example, in a conventional LMR, heat must be transferred from the liquid metal coolant, typically, liquid sodium, to a secondary fluid, typically a water-steam mixture. The present hybrid reactor transfers the heat from the liquid metal to a single vapor phase, i.e., to steam only. The single phase destination permits a simpler heat exchanger design. In addition, the consequences of a heat exchanger breach are much less severe since it is steam rather than liquid water that would mix with the liquid sodium.

These and other modifications to and variations upon the described embodiments are provided for by the present invention, the scope of which is limited only by the following claims.

What is claimed is:

1. A method for managing fuel in a boiling-water reactor, said method comprising the steps of:

arranging fuel bundles into an upper matrix and a lower matrix so that during reactor operation water flows from said lower matrix toward said upper matrix; and during a refueling operation, moving at least some fuel bundles from one of said matrices to the other of said matrices.

2. A method as recited in claim 1 wherein, during said refueling operation, at least some of said fuel bundles are transferred from said upper matrix to said lower matrix.

3. A method as recited in claim 2 wherein, in said refueling step, more fresh fuel bundles are introduced into said upper matrix than into said lower matrix, more fuel bundles from said upper matrix are moved to said lower matrix than are moved from said lower matrix to said upper matrix, and more fuel bundles are retired from said reactor from said lower matrix than from said upper matrix.

4. A method as recited in claim 2 wherein in said arranging step, said fuel bundles contain fuel rods with plenum ends, said fuel bundles in said upper matrix being oriented so that the plenum ends of the contained fuel rods are up, the fuel bundles in said lower matrix being oriented so that the plenum ends of the contained fuel rods are down, and in said refueling operation, bundles moved from said upper matrix to said lower matrix are inverted in the process.

5. A method of managing fuel in a boiling water reactor comprising the steps of discharging fuel units on a lower stage, moving fuel units on an upper stage to said lower stage, and installing fresh fuel units in said upper stage.

* * * * *